Feb. 22, 1944.  R. K. GODDARD  2,342,396
UNIVERSAL BALL JOINT
Filed Oct. 27, 1943

R. K. Goddard
INVENTOR.

BY C. A. Snow & Co.
ATTORNEYS.

Patented Feb. 22, 1944

2,342,396

UNITED STATES PATENT OFFICE 2,342,396

UNIVERSAL BALL JOINT

Ralph King Goddard, Springfield, Mass.

Application October 27, 1943, Serial No. 507,838

4 Claims. (Cl. 287—100)

The device forming the subject matter of this application is a universal ball joint, and the invention aims to provide novel means for connecting the constituent parts of the article for relative movement, novel means being supplied for preventing the ears of the shaft members from spreading under load, and the structure possessing great strength and being capable of withstanding hard use.

It is within the province of the disclosure to improve generally and to enhance the utility of devices of that type to which the present invention appertains.

With the above and other objects in view, which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Figure 1:
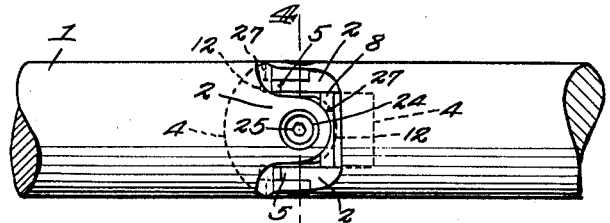
Fig. 1 shows, in side elevation, a device constructed in accordance with the invention.
Figure 2:
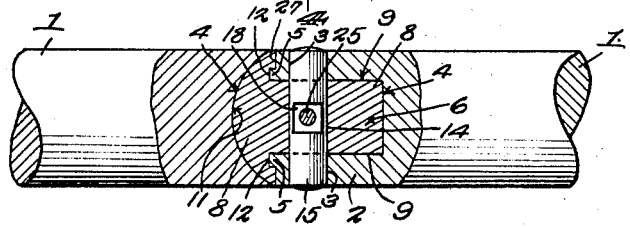
Fig. 2 is a side elevation wherein parts are broken away.
Figure 3:
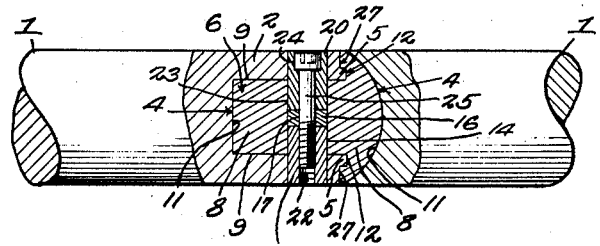
Fig. 3 is a side elevation wherein parts are broken away, the showing in Fig. 3 being at right angles to the showing in Fig. 2.
Figure 4:
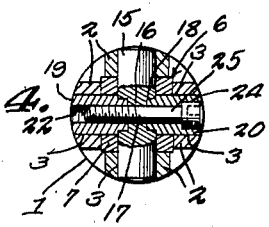
Fig. 4 is a transverse section on the line 4—4 of Fig. 1.
Figure 5:
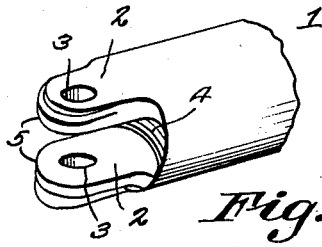
Fig. 5 is a perspective view disclosing one of the shaft members.

In carrying out the invention, there are provided like shaft members 1, the word "shaft" being used as a convenient name for the parts specified, and imposing no limitation as to use.

The shaft members 1 are supplied with longitudinally projecting ears 2, having concentric, transverse openings 3. Each shaft member 1 has a concaved, spherical end surface 4, disposed between the ears 2.

At their inner sides, the ears 2 have longitudinally projecting flanges 5, which are prolonged upon the outer, longitudinal edges, of the ears. The terminal surfaces of the ears 2 and of the flanges 5 are convexed upon a radius of which the axis of the openings 3 is the origin.

A coupler 6 is provided, and includes an intermediate body 7, and transverse heads 8 at opposite ends of the body, the heads projecting laterally, at right angles to each other. The body 7 is of rectangular cross-section. The heads have flat, parallel outer surfaces 9, merging into the corresponding surfaces 10 of the body 7.

The body 7 and the heads 8 of the coupler 6 fit closely between the ears 2 of the shaft members 1, the heads 8 being provided with outer, spherical surfaces 11, which engage the respective spherical surfaces 4 of the shaft members 1.

The laterally projecting, inner surfaces of the heads 8 are provided with convexed, transverse recesses 12, located immediately adjacent to the body 7 of the coupler 6, and receiving the flanges 5 on the shaft members 1, for rocking movement. This feature is of importance, since it prevents the ears 2 from spreading under load.

The body 7 on the coupler 6 is equipped with transverse openings 14, located at right angles to each other, one of the openings 14 registering with the openings 3 in the ears 2 of one shaft member 1, and the other of the openings 14 registering with the corresponding openings 3 in the ears of the other shaft member.

Pivot mechanism is provided for uniting the shaft members 1, for swinging movement in planes at right angles to each other.

Figure 7:
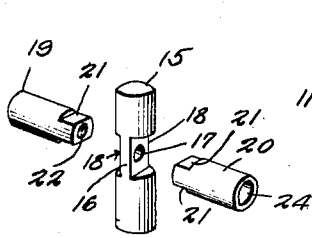
Fig. 7 is a composite perspective view wherein the pivot mechanism appears.
Figure 6:
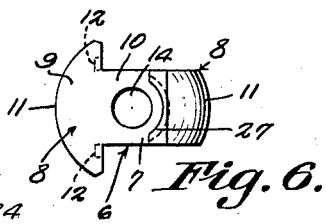
Fig. 6 is an elevation showing the coupler.

The pivot mechanism is shown in Fig. 7, and comprises a first pivot element 15, of circular cross-section, and having a reduced and flat intermediate neck 16, provided midway between its ends with a smooth hole 17. The reduced neck 16 affords rectangular seats 18 in opposite sides of the first pivot element 15.

The first pivot element 15 is inserted through the openings 3 in the ears 2 of one shaft member 1, and through one of the openings 14 in the coupler 6.

The other of the openings 14, and the openings 3 in the ears 2 of the other shaft member receive a second pivot means, next to be described.

The second pivot means not only permits swinging movement of the shaft member 1 wherein it is mounted, but, as well, constitutes a retainer for the first pivot element 15.

The second pivot means comprises combined retainers and pivot pins 19 and 20, having flattened tips 21, the tips being received in the seats 18 of the first pivot element 15, and, therefore, holding the first pivot element against endwise removal, provided that the pins themselves are held releasably against endwise removal.

The pivot pin 19 has a longitudinal threaded bore 22, and the pivot pin 20 is provided with a smooth longitudinal bore 23, having an enlargement 24 at its outer end.

The pivot members 19 and 20 are connected by a joining element, such as an Allen screw 25, the head 26 of the screw being received in the enlargement 24 of the bore 23 in the pivot pin 20. The screw 25 passes through the hole 17 in neck 16 of the first pivot element 15, and is threaded into the bore 22 of the pivot element 19, the inner end surfaces of the tips 21 of the pivot pins 19 and 20 being bound against opposed surfaces of the neck 16 of the pivot element 15.

Reverting to the ears 2 of the shaft members 1, it will be noted that the rounded ends of the ears, as distinguished from the rounded ends of the flanges 5, are mounted to rock in concavities 27 in the inner surfaces of the heads 8 of the coupler 6, the recesses 12 (which receive the flanges) being formed in the bases of the concavities 27.

The device forming the subject matter of this application possesses the advantages of a ball universal joint, together with means for preventing an outward springing of the ears 2 of the shaft members 1, under load, novel means being supplied for pivotally assembling the shaft members 1 with the coupler 6. The device possesses strength and compactness, and interposes no obstacle to a ready assembly and a ready taking down.

What is claimed is:

1. In a universal joint, shaft members having longitudinally projecting ears at their inner ends and provided with transverse spherical, concaved surfaces disposed between the ears, a coupler having transverse, terminal heads disposed at right angles to each other and located between the ears and having spherical end surfaces engaging the spherical surfaces of the shaft members, a transverse pivot means extended through the coupler and engaging the ears of one shaft member, and a transverse pivot means extended through the coupler and through the first specified pivot means, and engaging the ears of the other shaft member.

2. A universal joint constructed as set forth in claim 1, and wherein the inner surfaces of the heads are provided with transverse recesses, the inner ends of the arms having transverse, projecting flanges received in the recesses and constituting means for preventing the ears of each shaft member from spreading apart.

3. In a universal joint, shaft members having longitudinally projecting ears at their inner ends, a coupler extended between the ears of each shaft member, a first pivot member connecting the coupler with the ears of one shaft member and having oppositely disposed seats, second pivot members mounted in the ears of the other shaft member and disposed coaxially with respect to each other and at right angles to the first pivot member and having their inner ends received in the seats, to hold the first pivot member in place, and a releasable connection between the second pivot members.

4. A universal joint constructed as set forth in claim 3 and wherein the releasable connection is a draw-screw extended through the first pivot member, within the seats, the screw extending through one of the second pivot members and having a head engaging that pivot member, the screw being threaded into the other of the second pivot members and binding the inner ends of the second pivot members against the first pivot member, within the seats.

RALPH KING GODDARD.